United States Patent

Suzuki et al.

[11] Patent Number: 4,531,677
[45] Date of Patent: Jul. 30, 1985

[54] ATOMIZER

[75] Inventors: Jiro Suzuki, Nara; Hisanori Shimoda, Neyagawa; Hisashi Kodama, Katano, all of Japan

[73] Assignee: Matsushita Electric Industrial Co., Ltd., Osaka, Japan

[21] Appl. No.: 483,206

[22] Filed: Apr. 13, 1983

[30] Foreign Application Priority Data

Apr. 16, 1982 [JP] Japan .................. 57-64295

[51] Int. Cl.³ ................. B05B 1/26; B05B 1/14
[52] U.S. Cl. .................. 239/520; 239/524; 239/552; 239/553.3; 239/562
[58] Field of Search ............ 239/463, 474, 498, 504, 239/548, 550, 552, 553, 553.3, 565, 518, 520, 524, 553.5, 554, 555, 562, 571

[56] References Cited

U.S. PATENT DOCUMENTS

| | | | |
|---|---|---|---|
| 1,821,858 | 9/1931 | Te Pas | 239/524 |
| 2,073,187 | 3/1937 | Webb | 239/552 X |
| 2,129,145 | 9/1938 | Lincoln | 239/524 X |
| 2,135,138 | 11/1938 | Kendall | 239/498 |
| 2,533,969 | 12/1950 | Socall | 239/498 X |

Primary Examiner—Jeffrey V. Nase
Attorney, Agent, or Firm—Spencer & Frank

[57] ABSTRACT

An atomizer for atomizing liquid, having a disc clamped between two plate members, the disc being provided with a plurality of radial slits which, in combination with the flat surfaces of peripheral regions of the plate members, constitute liquid atomizing nozzle ports having a tetragonal cross-section. This arrangement permits an easy formation of a plurality of nozzle ports and remarkably suppresses the tendency of clogging of the nozzle ports by foreign matter. In addition, it is possible to form precisely fine nozzle ports of a diameter which could never be attained by the conventional process. The tetragonal cross-section of the nozzle ports provide peculiar jetting characteristics for attaining good atomization of the liquid.

5 Claims, 5 Drawing Figures

ATOMIZER

BACKGROUND OF THE INVENTION

1. Field of the Invention

The present invention relates to an atomizer for various uses in which atomization of a liquid is required, such as combustors, internal combustion engines, humidifiers or other air conditioning equipments, sprayers for spraying agricultural chemicals, sprayers for paints, steel cooling systems and so forth. More particularly, the invention is concerned with an atomizer suited to the uses mentioned above and improved to avoid clogging of the atomizing injector while attaining high precision of atomization and peculiar atomizing characteristics, thereby to obviate various problems in the prior art.

2. Description of the Prior Art

Hitherto, atomizers having a single hole injector have been used in atomization systems of the impingement atomization type or in equipments such as, for example, apparatus for producing synthetic fibers, fire-fighting hose nozzles and so forth. The atomizer of the invention having a single hole injector is intended for uses in which atomization of liquids is required.

The single hole injector is formed by drilling, electric discharging or other known techniques. With these known techniques, however, it has been difficult to form a nozzle port having a diameter of less than 0.1 to 0.05 mm. In addition, it has been quite difficult to maintain the required precision in this size of nozzle port when the atomizer is mass-produced. Furthermore, an atomizer having an injector with a single nozzle port tends to become clogged with foreign matter and, hence, it is necessary to filtrate the liquid by a filter or strainer of fine mesh in order to trap the foreign matter. Besides, the single hole injector is not suitable for obtaining a high rate of atomization. For these reasons, linear spraying single nozzles have not been popular as compared with pressure swirling nozzles and air-blast nozzles.

SUMMARY OF THE INVENTION

Object of the Invention

Accordingly, an object of the invention is to provide an atomizer having an injector with fine nozzle ports finished with high precision, improved to suppress the tendency of clogging and to permit easy fabrication, thereby to obviate the above-described problems of the prior art.

Another object of the invention is to provide an atomizer suitable for use as liquid atomizer of the impingement atomization type.

To these ends, according to an aspect of the invention, there is provided an atomizer comprising a pair of plate members having flat peripheral regions; a disc having radial slits and clamped between the flat peripheral regions of the plate members so that the slits, in combination with the flat surfaces of the peripheral regions, constitute nozzle ports which provide communication between the space between the plate members and the exterior of the plate members; and a liquid supply tube communicated with the space between the plate members.

These and other objects, features and advantages of the invention will become clear from the following description of the preferred embodiments taken in conjunction with the accompanying drawings.

DESCRIPTION OF THE PREFERRED EMBODIMENTS

Preferred embodiments of the invention will be described hereinunder with reference to the accompanying drawings.

Figure 1:
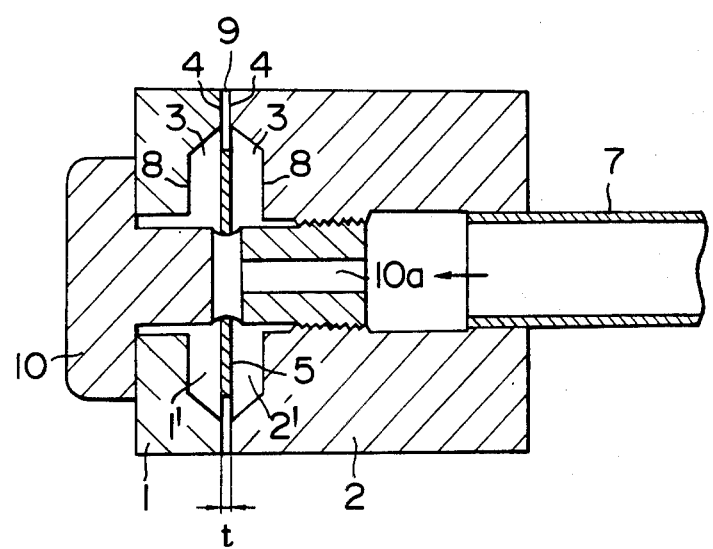
FIG. 1 is a sectional view of an essential part of an embodiment of the atomizer in accordance with the invention.

FIG. 1 shows in section an essential part of an embodiment of the atomizer in accordance with the invention. This atomizer has a pair of plate members 1 and 2 both of which are provided with recesses 3 and 3 and mirror-finished at their peripheral portions 4. These plate members 1 and 2 are assembled together with a disc or flat plate 5 clamped between the peripheral regions 4 thereof. The disc 5 is provided with radial slits 6 formed by etching. The space or cavity defined between the two plate members 1 and 2 is communicated with the exterior through these slits 6. Thus, each of the slits 6 constitutes a tetragonal nozzle port 9 the front and rear sides of which are defined by the flat surfaces of the peripheral regions 4 of the plate members 1 and 2.

A liquid supply tube 7 is connected to one end of the plate member 2. A liquid pressurized by a pump (not shown) is forcibly supplied into the space between the plate members 1 and 2, through the liquid supply tube 7 and the hole 10a of a bolt 10 screwed in the plate member 2, and is then introduced to the nozzle ports 9.

Liquid introduction passages 1' and 2' are formed between the bottom 8 of the recess 3 in the plate member 1 and the disc 5 and between the disc 5 and the bottom 8 of the recess 3 in the plate member 2, respectively. The liquid introduction passages 1' and 2' are communicated with the bore 10a in the bolt 10 mentioned before. Therefore, a part of the pressurized liquid is introduced into the liquid introduction passage 1' while the other part is introduced into the liquid introduction passage 2'. These parts of the pressurized liquid then merge toward each other at the upstream side of the nozzle ports 9 and then the liquid is discharged as liquid jets from the nozzle ports 9. It is possible to effect impingement atomization of the liquid for producing fine particles, by disposing impingement bodies ahead of the nozzle ports 9. Since the plate members 1, 2 and the disc 5 are integrally incorporated into one body by the bolt 10 extending through the disc 5, undesirable leakage of the pressurized liquid through portions other than the slits 6 is avoided advantageously.

The atomizer of the described embodiment offers the following advantages.

(1) The formation of the slits 6 in the disc 5 can be conducted without substantial difficulty. By using techniques suited to fine processing, e.g. etching, it is possible to form slits of a width less than 100 μ without substantial burrs or roughness, so that it is possible to obtain stable jets of liquid by avoiding any turbulence in the flow of liquid through the nozzle. In addition, the smooth surfaces of the slits 6 suppress the tendency of clogging with foreign matter.

(2) The peripheral regions 4 of the plate members 1 and 2 also can be processed easily without leaving any roughness in the surfaces of the slits 6 so that the above-mentioned advantages are not reduced.

(3) The passage of the pressurized liquid is branched into two narrow introduction passages 1' and 2' at the upstream side of the nozzle ports 9 and the pressurized liquid is introduced into the nozzle ports 9 through these narrow introduction passages 1' and 2'. In general, the Reynold's Number which is an index of turbulence of the flow is small when the passage is narrow. According to the invention, the passage upstream from the nozzle ports 9 is branched into two introduction passages each having a cross-sectional area which is about one-half of the passage upstream from the introduction passages and, hence, the Reynold's Number is reduced also almost by half, although the flow velocity is unchanged. In other words, the disc 5 serves to settle the flow of the liquid in the liquid introduction passages 1' and 2' so as to effectively prevent turbulence of the flow at the upstream side of the nozzle thereby eliminating any unfavorable effect on the liquid jet.

(4) In the atomizer produced by the conventional process, it is not possible to conduct a non-destructive inspection of the shape and size of the nozzle. According to the invention, however, the examination can be conducted without substantial difficulty simply by demounting the bolt 10.

(5) The nozzle ports can be formed easily in the form of radial slits in the disc 5, even when the atomizer is required to have a large number of nozzle ports.

(6) The disc 5 clamped between two plate members can be released as the screw 10 is loosened. In this state, the nozzle port 9 formed by each slit 6 is opened at both sides, so that it is possible to wash away foreign matter clogging the nozzle port 9 by a pressurized fluid stream. For the same reason, the atomizer can easily be disassembled for cleaning purposes.

Figure 3:
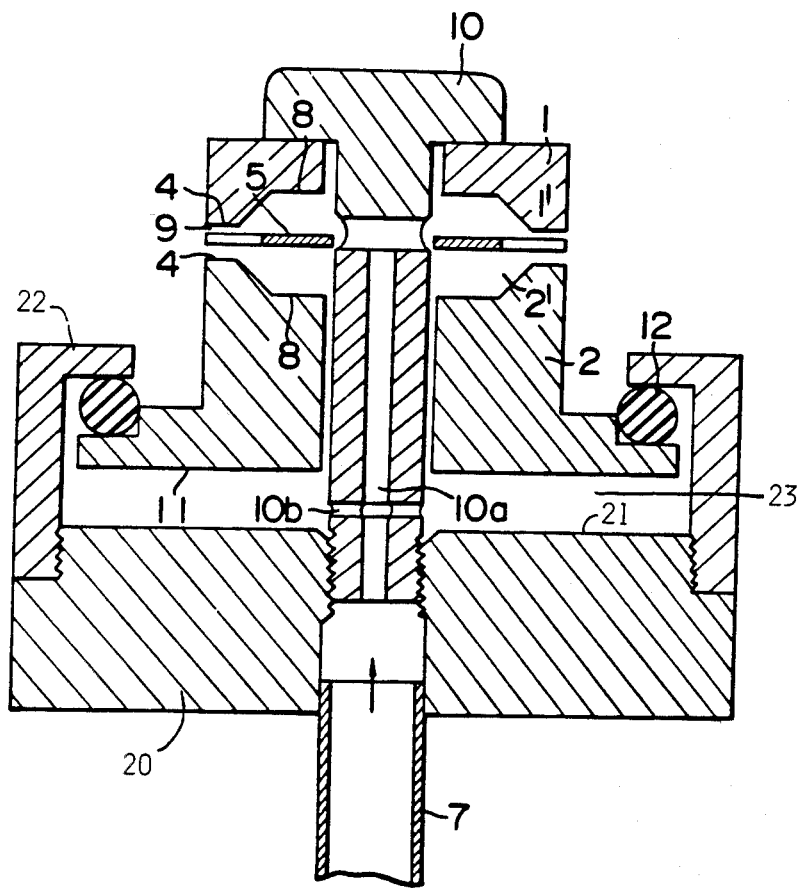
FIG. 3 is a sectional view of an essential part of another embodiment of the atomizer in accordance with the invention.

FIG. 3 shows another embodiment of the atomizer in accordance with the invention. In this embodiment, a cylindrical base member 20 surrounds the liquid supply tube 7 and has one end 21 provided with an inwardly projecting annular flange 22. The upstream plate member 2, which has a bottom portion 11 of a diameter greater than that of the top portion thereof, is positioned adjacent the end 21 of the base member 20 to provide a space 23. In addition, the bolt 10 is provided with radial holes 10b communicating with the axial bore 10a. As the pressurized liquid is supplied through the axial bore 10a in the bolt 10, the pressure of the liquid is transmitted to the space 23 under the bottom portion 11 of the plate member 2 so that a force is exerted on the lower surface of the bottom portion of the plate member 2 to displace the latter upwardly while compressing a rubber ring 12. In consequence, the plate member 2 is pressed against the plate member 1 with the disc 5 clamped therebetween so as to form the nozzle ports 9. As the pressure of the liquid is decreased, the plate member 2 is moved downwardly by the force of the elastic rubber ring 12 to release the disc 5 from the clamping force. It will be seen that any foreign matter clogged in the nozzle ports 9 is carried away by the flow of the liquid each time the disc 5 is released from the clamping force. Namely, the opening of two sides of the tetragonal nozzle port 9 is made automatically through the change in the fluid pressure to permit the clogged foreign matter to be easily removed.

Figure 2:
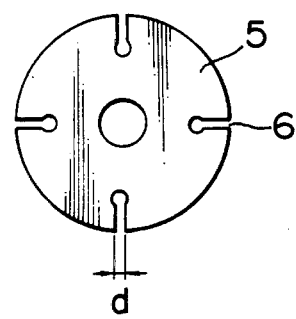
FIG. 2 is a plan view of a disc which is a constituent of the atomizer shown in FIG. 1.

In the described embodiment, the slit 6 has a width d which is greater than the thickness t of the disc 5 so that the nozzle port 9 has a rectangular cross-sectional shape, as will be seen from FIGS. 1 and 2. The clamping and releasing of the disc 5 between two plate members are made at the longer sides, i.e. the two opposing sides in the thicknesswise direction of the disc 5, so that the clogged foreign matter can be removed easily.

Figure 4:
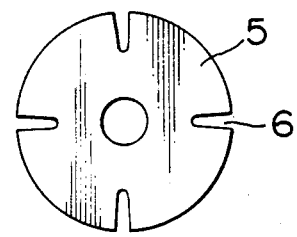
FIG. 4 is a plan view of another example of the disc.

FIG. 4 shows a modification of the disc 5 having slits 6 each of which diverges in the downstream direction as viewed in the direction of flow of the liquid. If the slit 6 has a constant width or converges in the downstream direction, foreign matter suspended by the liquid tend to be confined in the nozzle port 9. The foreign matter is then wedged into the nozzle port 9 to completely block the nozzle port 9 as the liquid pressure is applied thereto. To avoid this problem, it is preferred to make the slit 6 diverge in the downstream direction.

Figure 5:
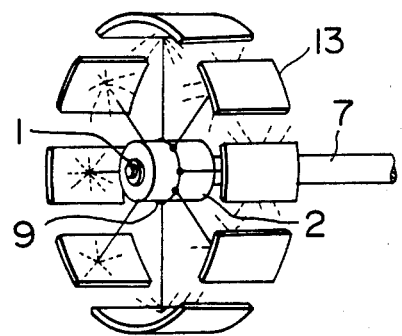
FIG. 5 is an illustration of an application of the atomizer of the invention.

FIG. 5 schematically show an atomizer in accordance with the invention. The liquid is discharged in the form of a smooth jet from each nozzle port 9. The jet has a tetragonal cross-section at the outlet of the nozzle port 9 because the latter has a tetragonal shape. As the liquid jet flows away from the nozzle port 9, however, the tetragonal cross-section of the liquid jet tends to be changed into a circular cross-section due to the surface tension. This change generates a vigorous vibration in the liquid jet to break up the latter into droplets. This effect is achieveable also with a circular nozzle. An experiment was conducted by the present inventors, in which kerosene pressurized to 8 $Kg/cm^2$ was jetted from a circular nozzle port of 0.1 mm dia. It was confirmed that the smooth jet is broken up into a droplets jet after travelling about 100 mm from the nozzle port outlet. A similar experiment conducted with nozzle port having a tetragonal cross-section showed that the above-mentioned distance can be reduced to about 40 mm by using a nozzle port having a tetragonal shape. The droplets jet thus formed then impinges upon a deflector 13 so that each droplet forms a fine liquid film on the impinging surface and the liquid film is further broken up into fine particles.

It is quite advantageous that, according to the invention employing nozzle ports having a tetragonal cross-section, it is possible to remarkably reduce the size of the atomizer as a whole because the tetragonal cross-section of the nozzle port permits a reduction in the atomizing distance as above-mentioned, i.e. the distance between the nozzle and the deflector 13, as compared with the nozzle port having a circular cross-section. In addition, the invention permits a reduction in the size of the nozzle port which in turn affords a more fine atomization than by a conventional nozzle in the impingement atomization system. Furthermore, the invention offers various advantages such as prevention of clogging by foreign matter, ease of processing and so forth.

In the described embodiment, the deflectors are disposed in the region of the droplets, this is not exclusive and the deflectors may be disposed on a circle of a diameter smaller than that in the described embodiment to permit the liquid jet to impinge upon the deflectors before the jet is broken up into droplets.

Although the invention has been described in specific terms, it is to be noted here that the described embodiments are only for illustrating purpose and various changes and modifications may be imparted thereto without departing from the scope of the invention which is limited solely by the appended claims.

What is claimed is:

1. An atomizer comprising
 a pair of plate member defining therebetween a cavity into which pressurized liquid to be atomized is introduced, said plate members having flat peripheral regions and being spaced from each other along a longitudinal axis;
 a flat plate having its thickness dimension extending in the direction of said longitudinal axis and having at least one slit extending completely through the thickness thereof, said slit having sides and said flat plate being clamped between said flat peripheral regions of said plate members so that said slit, in combination with the flat surfaces of said peripheral regions, constitutes a tetragonal nozzle port having a rectangular cross-section which provides communication between said cavity and the exterior of said plate members, whereby said nozzle port is formed by a surface of each of said plate members and the sides of said slit;
 a liquid supply tube connected to the cavity between said plate members; and
 a deflector disposed at the downstream side of said nozzle port.

2. An atomizer according to claim 1 comprising flat plate releasing means for releasing said flat plate from the position wherein it is clamped by said two plate members.

3. An atomizer according to claim 2 wherein one of said plate members includes a bottom portion having a diameter greater than the diameter of the portion thereof defining said cavity into which the pressurized liquid to be atomized is introduced, and in which said atomizer further comprises a cylindrical base member surrounding said liquid supply tube and having one end adjacent the bottom portion of said plate member, said one end of said cylindrical base member being provided with an inwardly projecting annular flange, radial apertures being provided in said liquid supply tube for connecting the space between the bottom portion of said plate member and said one end of said cylindrical base member with said cavity into which the pressurized liquid to be atomized is introduced; and wherein said flat plate releasing means comprises a resilient member disposed between said inwardly projecting annular flange and the bottom portion of said one of said plate members.

4. An atomizer according to claim 2 wherein the width of said slit is greater than the thickness of said flat plate.

5. An atomizer according to claim 1, wherein said slit diverges in the downstream direction as viewed in the direction of flow of said liquid.

* * * * *